April 8, 1941.      C. A. MANN      2,237,867
METHOD OF MAKING SPONGE IRON POWDER
Filed Oct. 29, 1940
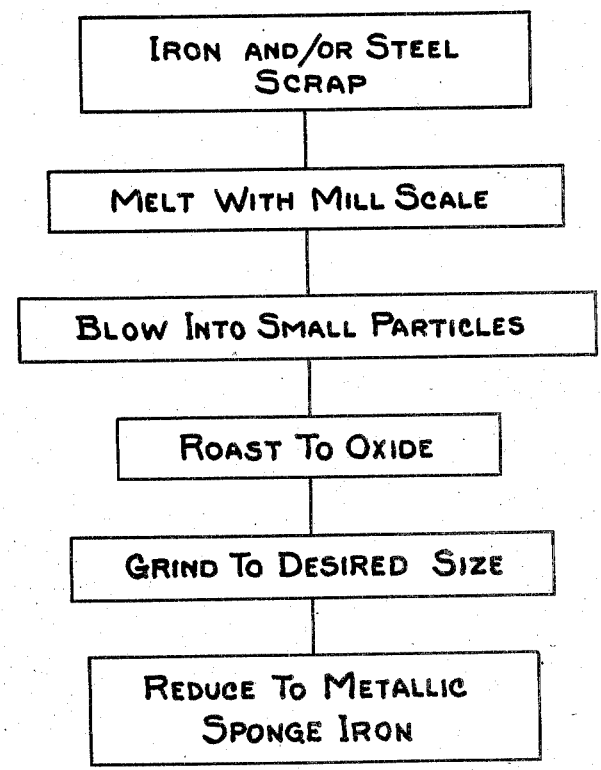
INVENTOR
Cecil A. Mann
BY
his ATTORNEYS Patented Apr. 8, 1941

2,237,867

UNITED STATES PATENT OFFICE 2,237,867

METHOD OF MAKING SPONGE IRON POWDER

Cecil A. Mann, Dayton, Ohio, assignor to General Motors Corporation, Detroit, Mich., a corporation of Delaware Application October 29, 1940, Serial No. 363,339

10 Claims. (Cl. 75—28)

This invention relates to the method for making sponge iron powder and is particularly concerned with the method of making sponge iron powder from iron and/or steel scrap material.

An object of the invention is to provide a method for making sponge iron powder from iron and/or steel scrap such as turnings, chips, etc., wherein the carbon content of the scrap is reduced to a predetermined low percentage, or substantially removed therefrom, and wherein the comminution of the iron is accomplished, while the iron is in the form of its oxide whereupon the comminuted iron oxide may be reduced to sponge iron powder of the desired size.

Another object of the invention is to provide a method of making sponge iron powder from iron and/or steel scrap material wherein the comminution step is carried out on oxide particles thereby simplifying and accelerating the process of comminution wherein the comminuted oxide may then be reduced to substantially pure iron powder.

Another object of the invention is to provide a method for making sponge iron powder wherein oxide powder particles of the desired size may be stored for long periods of the time and without any precautions for preventing oxidation thereof, such as are necessary when storing sponge iron powder, the oxide powder being reduced to sponge iron powder a short time before use thereof in the manufacture of porous iron articles.

Further objects and advantages of the present invention will be apparent from the following description, reference being had to the accompanying drawing wherein a preferred embodiment of the present invention is clearly shown.

The drawing is a flow chart of the method of procedure in making sponge iron powder from ferrous scrap material.

Sponge iron powder is a desirable starting ingredient in the manufacture of porous iron articles wherein the powder is preferably briquetted and sintered. Such powder heretofore has been made by reducing iron ores to metallic sponge iron. The greater portion of sponge iron made by this method comes from Sweden where the iron ore is of exceptionally high purity and contains but small amounts of impurities. Iron ores in other portions of the world are not of such high purity and therefore upon reduction thereof it is necessary to dispose of the gangue in order to have a finished product of sufficiently high purity to yield articles of the desired strength, this removal presenting a difficult problem. It is apparent that if any substantial quantity of gangue is present in the iron powder that it will weaken articles made therefrom since there is no consolidation within the articles at the points where the gangue is present.

Another method of making sponge iron powder that has been successful comprehends the carburization of molten scrap material and disintegration thereof whereupon the steel particles are of glass hardness and may be crushed to a desirable small size in a ball mill. This comminuted material is then decarburized to form iron powder. This powder is not of the same spongy structure as Swedish sponge iron powder but is quite useful in the manufacture of porous iron articles.

The present invention is particularly directed to sponge iron powder made from iron and/or steel scrap wherein the problem of gangue is not apparent. I propose to melt iron and/or steel scrap, wherein the total mixture does not preferably exceed 0.2 to 0.8% of carbon under oxidizing conditions whereupon the carbon is burned out of the molten mixture, or to add mill scale to the mixture to help oxidize the carbon therefrom. After the mixture has been decarburized so that the percentage of carbon is less than .05%, I disintegrate the molten metal by blowing the same into a bath of water by means of steam. Obviously this may also be accomplished by blowing molten metal into any other fluid medium, such as air and it is not entirely necessary to use steam since the metal may be atomized in any other suitable manner. From this disintegration step I obtain relatively small particles of iron which are next preferably placed upon a continuous conveyor belt and roasted at temperatures preferably above 1000° F. under highly oxidizing conditions for completely transforming the particles of iron to particles of iron oxide. Atmospheres containing $O_2$ in varying amounts, such as air; steam, $CO_2$ containing gases, air and steam, etc., may all be used. It is apparent that the disintegration step is carried out under conditions which tend to oxidize the particles that the time required to roast the particles to iron oxide will be reduced. I next take the iron oxide particles and comminute them to the desired size particles, for example, so that all of the particles will pass a 100 mesh screen or a 200 mesh, as the case may be. The iron oxide particles are of a friable nature and are very easy to comminute in most conventional types of grinding equipment, for example, a ball mill, a rod mill or a centrifugal disintegrator, etc.

The highly comminuted oxide material is then preferably continuously passed through a furnace at temperatures preferably above 1000° F. wherein highly reducing conditions are maintained for reducing the iron oxide to metallic sponge iron. This step may be accomplished in an expeditious manner since the particles have such a small cross section that the reducing atmosphere reacts with the oxygen therein in a relatively short time. For a reducing atmosphere, I prefer to use hydrogen, either pure or diluted with inert gas, since this gas does not have any tendency to recarburize the particles upon reduction thereof although CO containing gases may be used if the water vapor content is controlled to prevent carburization. After the reduction treatment, the particles are ready for use.

The advantage of this process is apparent in that the iron oxide being friable is very easy to comminute and in fact numerous types of equipment may be used to accomplish this end which are not feasible when comminuting carburized iron, for example. Furthermore, the quantity of material for any given time which may be comminuted is greater than when comminuting carburized hardened iron. Thus the process is more economical from a production standpoint since it permits larger quantities of material to go through the comminuting step which is as a rule the step in the process which requires the greatest time and most care when operating under other processes for making the iron powder described herein.

Another feature of the present invention resides in the fact that iron powder, particularly sponge iron powder, can not be stored under atmospheric conditions for any long periods of time due to its seemingly activated condition toward oxidation, this problem arising from the fact that such a large surface is presented to the atmosphere due to its spongy nature. For this reason it is not advisable to store large quantities of sponge iron powder since it often requires a reduction treatment before it can be successfully used. In the present method it is possible to carry the steps of manufacture through the comminution step and store the comminuted iron oxide powder. Obviously, this can not further oxidize and no precautions need be used during the storage thereof. As production requires, quantities of this oxide may be reduced and used immediately in the briquetting of the iron articles which may be sintered to form porous iron objects. Thus in the average production plant it is possible to make sponge iron powder that is completely reduced and ready to use the day of its manufacture.

While the embodiments of the present invention as herein disclosed, constitute a preferred form, it is to be understood that other forms might be adopted, all coming within the scope of the claims which follow.

What is claimed is as follows:

1. The method of making sponge iron powder comprising the steps of, decarburizing steel scrap to a carbon content of less than .05% by operating on the scrap in a molten state, disintegrating the scrap into small particles, oxidizing the small iron particles to substantially pure iron oxide, comminuting the oxide so formed to the desired size, and then reducing the comminuted oxide to metallic sponge iron powder.

2. The method of making sponge iron powder, the steps comprising, melting steel with the addition of mill scale for decarburizing the steel to a predetermined low carbon content, disintegrating the molten decarburized steel by blowing the same into a fluid medium whereby the decarburized steel is precipitated into small particles, roasting the disintegrated material to form substantially pure iron oxide, comminuting the iron oxide to powder of the desired size, and then reducing the oxide powder to metallic sponge iron.

3. The steps in making powdered sponge iron comprising, melting steel scrap under decarburizing conditions, cooling the decarburized molten metal so as to break the same up into small particles of substantially pure iron, roasting the small particles of substantially pure iron in order to form substantially pure iron oxide, comminuting the iron oxide into particles of the desired size and then reducing the comminuted oxide particles to metallic sponge iron.

4. The steps in making sponge iron powder comprising, melting steel scrap under decarburizing conditions for substantially removing the carbon therefrom, disintegrating the molten decarburized steel into relatively small particles, oxidizing the disintegrated particles into substantially pure iron oxide, comminuting the iron oxide into particles of the desired size, and then reducing the iron oxide into substantially metallic sponge iron.

5. In a method of making soft iron powder which has a spongy physical structure comprising the steps of; melting iron and/or steel scrap under decarburizing conditions for substantially removing the carbon, cooling the molten decarburized scrap under conditions whereby the scrap is broken up into small particles, oxidizing the small particles of iron to substantially pure iron oxide, breaking up the particles of pure iron oxide into oxide powder of the desired size, and then transforming the iron oxide particles to particles of substantially pure iron under reducing conditions whereby the particles of pure iron have a spongy physical structure.

6. In a method of making substantially pure sponge iron powder the steps comprising; melting iron and/or steel, decarburizing the molten metal to a carbon content of less than .05%, blowing the decarburized molten iron into a fluid medium whereby small particles of iron are precipitated, oxidizing the particles of iron to substantially pure iron oxide, comminuting the iron oxide into iron oxide powder having substantially the desired particle size, and then reducing the iron oxide powder to substantially pure metallic sponge iron powder.

7. The steps in the method of making iron powder comprising; melting iron and/or steel scrap under decarburizing conditions for substantially removing the carbon therefrom, disintegrating the molten decarburized metal into particles of relatively small size, subjecting the decarburized particles to an oxidizing medium whereby each particle of metal is transformed into a particle of substantially pure iron oxide, breaking up the particles of iron oxide to further reduce the size thereof to a predetermined particle size, and then treating the small particles of iron oxide with a reducing atmosphere for removing the oxygen content therefrom and thereby transforming the particles to particles of substantially pure metallic iron.

8. The steps in the method of making iron powder comprising; mixing iron and/or steel scrap with iron oxide such as mill scale, melting the mixture for decarburing the scrap material to iron having a carbon content of less than .05%, disintegrating the molten iron into particles of relatively small size, heating the particles to a temperature above 1,000° F. under highly oxidizing conditions for substantially completely transforming the particles of iron to particles of iron oxide, disintegrating particles of iron oxide to particles of relatively smaller size, and then reducing the disintegrated iron oxide to substantially pure iron powder.

9. The steps in the method of making iron powder comprising; melting iron and/or steel scrap under decarburizing conditions so as to reduce carbon content thereof to less than .05%, disintegrating the molten iron into particles of relatively small size, roasting the particles of the decarburized iron at a temperature above 1,000° F. in the presence of an oxidizing atmosphere for causing the particles of iron to be transformed substantially completely to particles of iron oxide, comminuting the iron oxide particles so as to reduce the particle size thereof to a particle size desired, and then heating the comminuted oxide under highly reducing conditions for a period of time sufficient to reduce the iron oxide substantially completely to metallic iron powder.

10. The steps in the method of making iron powder comprising; melting ferrous scrap material containing a high percentage of iron under decarburizing conditions for substantially removing the carbon therefrom and thereby forming substantially pure iron; disintegrating the molten iron into particles of relatively small size, treating said particles under oxidizing conditions for making the particles friable, comminuting the friable particles into a powder having a particle size less than the particle size of the original powder and then heating the comminuted particles under reducing conditions for substantially removing oxygen therefrom whereby the final product is substantially pure iron powder.

CECIL A. MANN.